May 26, 1936.  A. B. ALTHOUSE  2,042,202
AUTOMOBILE CONTROL DEVICE
Filed March 20, 1934  2 Sheets-Sheet 2
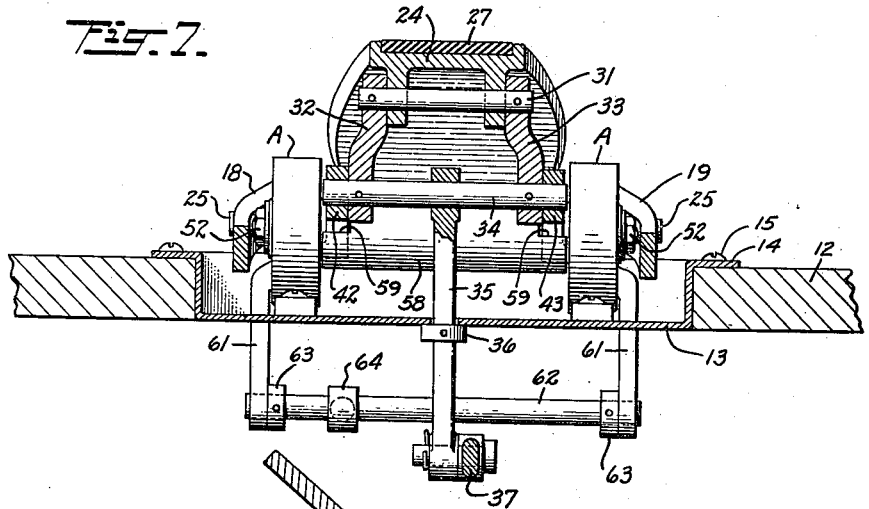
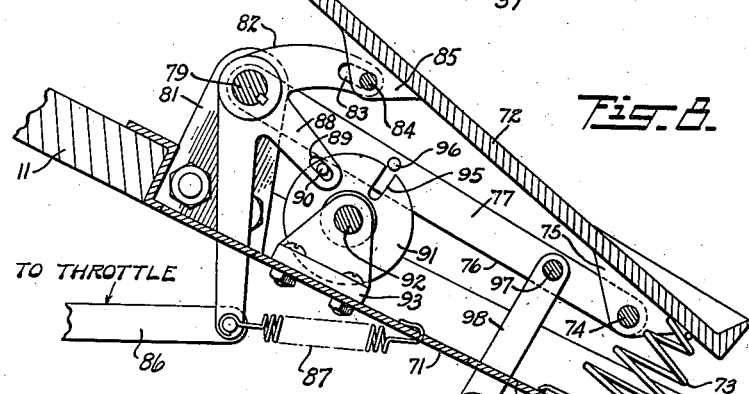
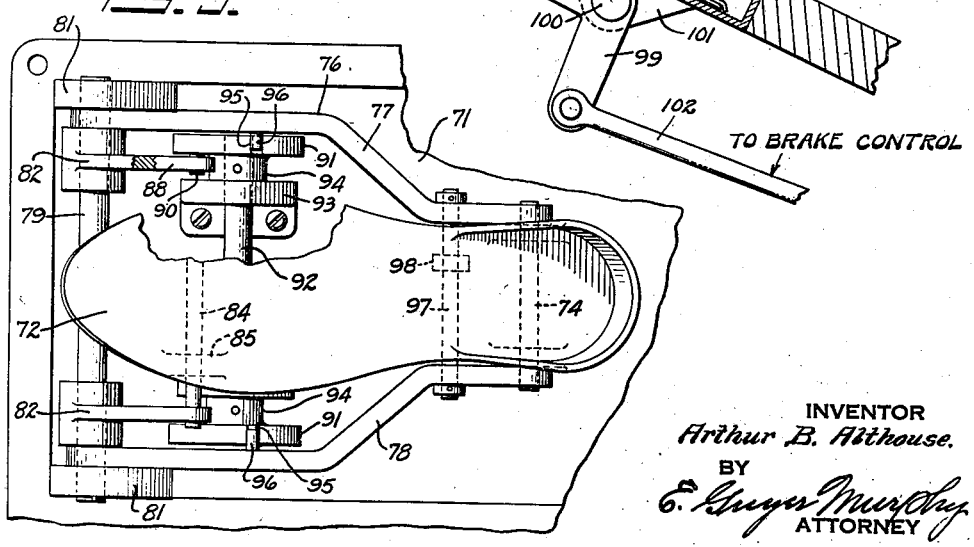
INVENTOR
Arthur B. Althouse.
BY
E. Guyer Murphy
ATTORNEY Patented May 26, 1936

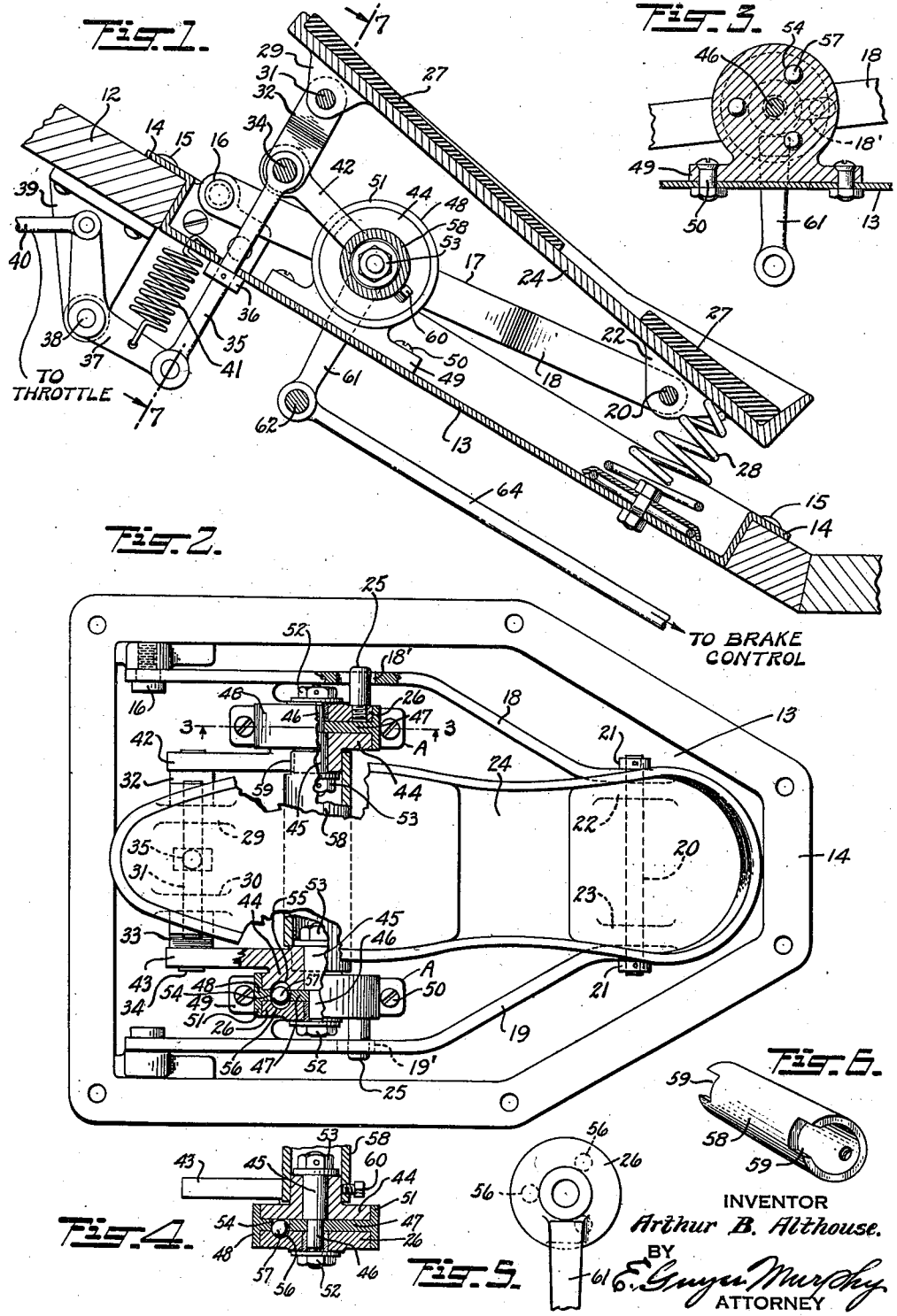

2,042,202

UNITED STATES PATENT OFFICE 2,042,202

AUTOMOBILE CONTROL DEVICE

Arthur B. Althouse, Manoa, Pa.

Application March 20, 1934, Serial No. 716,473

5 Claims. (Cl. 192—3)

This invention in general relates to an improved means for operating motor vehicles, having for its object a novel automobile control device or system permitting the control of the accelerating or fuel supply regulating means and the braking mechanism of a self-propelled vehicle by a single member or foot pedal.

Another object is the provision of means with a view to a still further simplification of the control instrumentalities of a motor car, so that a single control member or foot pedal may actuate the gas or fuel throttle and the braking means without removing the foot from the said single pedal.

A further object is to provide a single pedal effective for accelerating the engine of the automobile while preventing the accidental or simultaneous operation of the braking mechanism, and conversely for actuating the braking means while preventing the simultaneous operation of the accelerating means.

A further object of the invention is to provide a novel, detachable assembly that may be conveniently applied to practically any standard make or conventional type of motor car, so that the latter may be operated by a single control device in accordance with the present invention.

It is also an object of the invention to provide an automobile throttle and braking control mechanism of generally improved construction, that will be simple, durable and inexpensive in construction, as well as convenient, practical, serviceable and efficient in its use.

With these and other objects not specifically referred to, the invention consists in certain novel parts, arrangements and combinations which will be described in connection with the accompanying drawings wherein, Fig. 1 is a central longitudinal sectional view, partly in elevation, of an embodiment of the invention secured to the flooring of an automobile (not shown), and operatively connected to the braking and throttle or accelerating mechanism of the same;

Fig. 2 is a top plan view, partly in section, with parts broken away, of the arrangement illustrated in Fig. 1, and showing the locking or movement selecting devices in neutral position;

Fig. 3 is a central sectional view, partly in elevation, taken on line 3—3 of Fig. 2, as seen in the direction of the arrows, and showing the fixed member of one of the locking or movement selecting devices, with an adjacent coacting rotatable disc, and certain other coacting details, indicated in dotted lines;

Fig. 4 is a sectional plan view of one of the movement-selecting or locking devices and certain elements connected thereto, showing an outer disc locked to the fixed centre disc, and an inner disc free to rotate, thereby permitting the actuation of the gas throttle or accelerating mechanism;

Fig. 5 is a side view of one of the outer rotatable elements or discs, together with its integral arm;

Fig. 6 is a perspective view of a sleeve member employed to lock the two oppositely positioned locking or movement-selecting devices together for operation in unison;

Fig. 7 is a transverse sectional view, taken on the line 7—7 of Fig. 1, as seen in the direction of the arrows, showing more fully the disposition and coaction of certain parts;

Fig. 8 is a view similar to Fig. 1, of a modified form of the invention; and

Fig. 9 is a view similar to Fig. 2 of the modified form of the invention shown in Fig. 8.

For the purpose of illustrating my invention, I have shown in the accompanying drawings forms thereof which are at present preferred by me since the same have been found in practice to give satisfactory and reliable results, although it is to be understood that the various instrumentalities of which my invention consists can be variously arranged and organized and that the invention is not limited to the precise arrangement and organization of the instrumentalities as herein shown and described.

Referring to the drawings wherein similar characters of reference indicate corresponding parts in the several views of the preferred forms of the invention, 12 designates a portion of the inclined flooring of a motor vehicle (not shown) adjacent the operator's seat, the said flooring having suitable cut-out portions to accommodate a metal pan or stamping 13, wherein the means, forming an important feature of this invention are arranged. The pan or stamping 13, the bottom of which is depressed or countersunk, has flanges 14 thru which screws 15 are threaded into the flooring 12, thus removably securing the said pan and the assembly therein to the vehicle.

Pivotally secured to studs 16 suitably fastened to opposite sides of the pan 13, is a yoke or U-shaped member 17, the opposite arms 18, 19 of which are hingedly joined to a pin 20 secured by collars 21 to a pair of opposed lugs or brackets 22, 23, fastened to an underside of a foot pedal 24. The arms 18, 19 of the yoke, as best shown in Fig. 2, have slots 18', 19' which receive outwardly projecting pins or studs 25 each of said pins 25 being fastened to an adjacent outer, rotatable disc or member 26, forming a part of each of a pair of similar locking, control or movement-selecting devices indicated generally at "A", and hereinafter described more fully.

The foot pedal 24, which may have suitable cushioning means 27 on its upper surface, is yieldingly and resiliently supported at the rear end by a spring 28, and at its front end has two depending lugs 29, 30, in which is rotatably mounted a bar or pin 31 whereon two links or arms 32, 33, are fastened. The arms 32, 33 at their lower ends are fastened to a second pin 34, to the centre of which latter a link or arm 35 is pivotally connected. The arm 35, which is limited in its upward movement by a collar 36 fastened thereto and normally engaged against the outer surface of the pan 13, is in turn hingedly connected at its lower end to a bell crank lever 37 rockingly mounted on a stud 38 fastened to a lug or bracket 39 suitably attached to the flooring 12. The bell crank lever 37, which is connected by a rod or link 40 to the fuel regulating throttle or accelerating mechanism (not shown), is biased by a spring 41 attached at one end to an arm of the said lever 37, the other end of the spring being anchored to the pan 13. The spring 41 also serves to resiliently thrust upwardly the link 35 and parts attached thereto, thereby maintaining the forward end of the foot pedal 24 in the normal and neutral position shown in Fig. 1.

To the ends of the pin 34 a pair of arms 42, 43 are hingedly attached, each of the said arms, as best shown in Fig. 2, having integrally formed therewith a member or disc 44 constituting the other movable member of the device "A" and adapted to be rotatably mounted on a shouldered stud 45 having a reduced portion as at 46 which protrudes thru a central opening in the web or body portion 47 of a stationary disc or member 48 having a unitary base or pedestal 49 which is suitably secured as by the screws or nuts 50, to the metal pan 13. The body portion of the member 48 as above-referred to, which is the fixed or stationary member of the movement or control selecting device A, has integrally formed thereon an annular flange 51 serving as a covering or partial housing for the rotatable members 26, 44, above referred to, the member 44 being mounted on the stud, the reduced portion 46 providing a shoulder which is thrust as a stop against the web 47 of the stationary member 48. Nuts and washers indicated generally at 52, 53, at either end of the stud 45 rotatably secure the outer and inner discs 26 and 44 respectively, to the fixed disc or member 48.

By inspection of Figs. 2, 3, and 4, it will be observed that the fixed disc is provided with three radially positioned holes or passageways 54, while each of the rotatable members have three semi-spherical, radially positioned pockets indicated generally at 55 in the inner discs 44 and at 56 in the outer disc 26, which pockets in the normal and neutral position of the foot pedal as shown in Figs. 1 and 2, are adapted to register with the holes or passageways 54 of the fixed member 48. In each of the passageways 54 a steel ball 57 is arranged, the said ball in the neutral position of the device, normally protruding from either side of each passageway 54 and partially into the adjacent pocket of the inner disc and of the outer disc (Fig. 2), so that whichever of the two rotatable discs is first given a preliminary turn thru an arc as small as a fraction of the diameter of the ball, the latter will be wholly projected out of the pocket of the moving disc and thence into the pocket of the disc on the other side of the fixed member 48, as clearly shown in Fig. 4, to the extent of one-half of the said ball, the other half thereof now resting in the passageway 54, the smooth, unbroken lateral surface now presented of the disc moved or moving, now preventing egress of the ball which is now effective for locking in the immediate instance the outer disc 26 to the fixed member 48 while simultaneously permitting further rotation of the disc first moved for a purpose to be described hereinafter.

With a view to synchronizing the movement of the two control or movement selecting devices A, each of which is located at an opposite side of the pan 13, a sleeve 58 having a pair of notches 59 is provided. The hub of each of the inner rotatable members 44 is accommodated in the bore of the said sleeve 58, the notches 59 of which are adapted to span the arms 42 and 43 of the members 44, so that the latter will turn in unison. Set screws 60 in addition may be provided if desired to further secure the sleeve to the hubs of the inner rotatable members.

Suitably secured to or integrally formed with each of the outer rotatable discs 26 is an arm 61 on the pair of which a pin or shaft 62 held against axial movement by the collars 63, is rotatably mounted. To the pin or shaft 62, a link 64 connected to the brake mechanism (not shown) of the vehicle, is pivoted, whereby, when the outer discs, as hereinbelow described, are turned, the link 64 will be swung or moved to operate the brakes.

The operation of the device in the instant embodiment may now be summarized as follows:—

Assuming the engine (not shown) of the vehicle is functioning in the ordinary manner and that it is desired to accelerate same, the forward end of the foot pedal 24, now in neutral position (Fig. 2), will be depressed by the ball of the foot of the operator, thereby thrusting down the arms 32, 33 and consequently angling the arms 42, 43 connected to the inner rotatable discs 44. The initiation of the turning movement of the discs 44, as indicated above will instantly lock the outer discs to the fixed middle discs while completely freeing the inner discs that have been first rotated. The descent of the arms 32, 33 and the pin 34 secured thereto will push downwardly the arm 35 to which the spring-biased bell crank lever 37 is hinged, the rocking of which latter will actuate the accelerating or fuel regulating mechanism to the desired degree and in accordance with the extent of rocking or swinging movement of the forward end of the foot pedal 24 about the pin 20 as an axis. The actuation of the brake mechanism while the accelerating means are being manipulated, it will be seen, is at no time permitted by the action of the movement-selecting device.

When it is desired to brake the vehicle, for example when same is in motion, the operator will permit the spring 41 to at once return to the normal and neutral position shown in Fig. 1, thereby returning also the control or movement-selecting assemblies to their neutral position as shown in Fig. 2, after which with a movement of his heel, he will depress the rear end of the pedal 24 against the resistance of the compression spring 28 thus pivoting the forward end of the pedal about the pin 31 as an axis while angling downwardly the arms of the yoke 17 and consequently turning in a clockwise direction (as viewed in Figs. 1 and 2) both the outer discs 26 and the arms 61 secured thereto. The beginning of the rotation of the outer discs 26 will thrust the balls 57 from the neutral position indicated in Fig. 2 and into the three semi-spherical pockets of the inner discs 44 thereby immediately locking the latter to the fixed members 48 and at the same time freeing the outer discs 26 for further and unimpeded rotation. The angular movement of the arms 61 will swing the link 64 and actuate the brake mechanism to the desired degree.

Referring to the modified form of the invention shown in Figs. 8 and 9, 71 designates a stamping or pan of a construction similar to that shown in the first form of the invention described above and secured to the flooring 12 in any suitable manner. In the instant form of the invention, the foot pedal 72 at its rear end is resiliently supported above the pan 71 by a coil spring 73 suitably secured to the latter.

Pivotally mounted on a bar or pin 74 fastened to a pair of depending lugs 75 arranged on the bottom of the pedal 72 is a yoke indicated generally at 76, the opposite arms 77, 78 of which are pivoted at their forward end to a shaft or bar 79 rotatably supported in a pair of opposed lugs or brackets 81, and having keyed thereto two levers 82, arranged in spaced relation. The upper arm of each lever 82 is formed with a slot 83 wherein rides a pin or bar 84 fastened to lugs 85 on the bottom of the forward portion of the foot pedal 72. The lowermost arm of the lever 82, as clearly shown in Fig. 8, is hingedly connected to a link 86 connected with the fuel regulating supply or accelerator (not shown) of the vehicle, and biased in the normal position shown by a spring 87 suitably secured to the pan 71. Each lever 82 is also provided with an intermediate arm 88 having a slot 89, receiving a pin 90, fastened to a disc 91, secured to an axle or shaft 92 rotatably mounted in a pair of lugs or brackets 93 suitably fastened to the pan 71. Each of the discs 91 which are spaced from the supporting brackets 93 by hubs or collars 94 fastened to the shaft 92 and holding the latter against axial movement, is formed with a radially extending slot 95 which is adapted to receive an inwardly projecting pin or small roller 96 secured to each of the arms 77 and 78 when the latter are angled downwardly in a clockwise direction by the depression of the foot pedal 72, as described later. The arms of the yoke 76 are also joined at their rearward end by a pin 97 to which is pivoted an arm 98 hinged to a bell crank lever 99 swingably mounted on a stud 100 fastened to a bracket or lug 101 secured to the pan 71.

The operation of the modified form of the invention, is in many respects, similar to that of the embodiment shown in Figs. 1 to 7, inclusive, and briefly is as follows:—

Assuming the vehicle is in motion and that it is desired to decelerate or bring same to a stop, the foot pedal 72 will be depressed at the heel portion against the resistance of spring 73 and about the pin 84 as an axis thereby simultaneously depressing the link 98 to actuate the brake mechanism thru the bell crank lever 99 and link 102, and thrusting the pins or rollers 96 into the adjacent slots 95 of the discs 91, thus preventing rotation of the latter and consequently the turning of the lever 82 and movement of parts connected thereto. Should it now be desired to accelerate the vehicle, the forward end of the pedal 72 will be thrust or angled downwardly by the operator thereby swinging the lever 82 in a clockwise direction and bringing the circular edges of the said discs into engagement with the rollers 96 which latter are now prevented from entering the slots 95 as the latter turns with the discs 91. The arms 77, 78, and consequently the rearward portion of the pedal 72 will now be prevented from rotation as the front end of same swings down and turns the bell crank lever 82 in a clockwise direction to actuate the throttle by means of the connecting link 86.

In both forms of the invention, it is to be noted that whichever end of the pedal is first moved will immediately free that end for performing its indicated function while simultaneously locking the other end against movement. The device also, as clearly indicated in Figs. 2 and 8, will prevent synchronous operation of both ends of the pedal, thus making it impossible to accelerate and brake the vehicle at the same time. This selective action of the invention serves in large measure to prevent the accidental manipulation of the accelerator for the brake, or the brake for the accelerator, as frequently happens to nervous and inexperienced operators of motor vehicles.

Both embodiments of the invention, as best depicted in Figs. 2 and 9, are conveniently arranged in their respective pans 13 and 71, so that by suitably cutting out an opening in the flooring of the conventional type of automobile adjacent the operator's seat, either of the assemblies may be conveniently and quickly installed, in this manner modernizing the fuel regulating and braking mechanism of the automobile to which it is attached.

Either form of the invention has been particularly designed and adapted for use with what are now known in the art as "power brakes" which are generally actuated by fluid pressure controlled by a valve connected to the operating pedal, so that a comparatively slight movement of the said pedal will suffice to make effective a variable fluid pressure which may exert a maximum force of considerable value. The method and means described and illustrated, however, are readily applied to the old style conventional brake mechanism employing mechanical and non-fluid means for actuating same.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention what I claim as new and desire to secure by Letters Patent is:—

1. The combination with the accelerator and brake mechanism of a motor vehicle, of a single foot pedal, said pedal being mechanically and operatively connected to said accelerator and brake mechanism, and means connected to the forward end and rear end of said pedal for selectively locking same at either end while permitting movement of the opposite end, whereby said pedal is operative to selectively actuate either the accelerator or the braking mechanism.

2. The combination with the accelerator mechanism and brake mechanism of an automobile, of a single pedal, means connecting the said pedal to the said accelerator mechanism and brake mechanism, and other means including at least one fixed member and a plurality of other members movable relatively thereto for automatically maintaining the pedal in a position selectively effective for operating either of said mechanisms while maintaining the other mechanism inoperative.

3. A device of the character described for accelerating and braking a motor vehicle by means of a single foot pedal comprising in combination a foot pedal, means resiliently supporting said pedal at either end, links connecting the pedal to the accelerator and brake mechanism of said motor vehicle, a member fixedly secured to the vehicle, a pair of other members coactingly connected and rotatable relatively to said first mentioned member so that when one member is turned relatively to the fixed member, the other and normally rotatable member will be locked to the first member, and instrumentalities connecting the rotatable members to forward and rear portions of the said pedal.

4. The combination with the fuel regulating supply and brake mechanism of an automobile, of a lever, means connecting said lever to the said fuel regulating supply and brake mechanism, and other means including a ball and socket assembly connected to the lever, supply and brake mechanism for preventing movement of said lever in one direction while permitting movement of same in another, whereby the fuel regulating supply and the brake mechanism may be operated one at a time by the lever.

5. The combination with the accelerator and brake mechanism of an automobile, of a single foot operated means, a movement-selecting device for said means, other means pivotally connecting the first mentioned means at each end thereof to the movement-selecting device, and instrumentalities connecting the foot operated means to the accelerator and the brake mechanism, whereby when one end of the foot operated means is swung about the other end as a pivot, said device will permit movement of the end first swung while preventing movement of the latter end.

ARTHUR B. ALTHOUSE.